United States Patent

[11] 3,572,770

[72] Inventor   Jakob Kagi
                Wiesendangen, Zurich, Switzerland
[21] Appl. No. 792,046
[22] Filed      Jan. 17, 1969
[45] Patented   Mar. 30, 1971
[73] Assignee   Sulzer Brothers, Ltd.
                Winterhur, Switzerland
[32] Priority   Jan. 23, 1968
[33]            Switzerland
[31]            1027/68

[54] MOUNTING FOR A HEAT TRANSMITTER
     11 Claims, 5 Drawing Figs.
[52] U.S. Cl. ................................................. 285/158,
                                          285/286, 285/421
[51] Int. Cl. ......................................... F16l 41/00,
                                              F16l 13/02
[50] Field of Search .................................... 285/(S.F.),
         162, 159, 137 (Cursory); 248/56, 27 (Cursory);
                         16/2; 285/158, 421, 286 (Cursory)

[56]                References Cited
                UNITED STATES PATENTS
1,215,595  2/1917   Weikert ........................  285/S.F.
1,651,016  11/1927  Cotton .........................  285/158
2,514,504  7/1950   Moline .........................  285/S.F.
2,912,712  11/1959  Shamban et al. ..............     16/2
3,056,852  10/1962  Sachs ..........................  285/S.F.
3,076,668  2/1963   Famely .......................... 248/56X
3,154,283  10/1964  Spinnato .....................    285/S.F.
                 FOREIGN PATENTS
  491,710  3/1954   Italy .............................  285/421

Primary Examiner—Thomas F. Callaghan
Attorney—Kenyon and Kenyon, Reilly Carr & Chapin ABSTRACT: The tubes of the transmitter are mounted within the tube plate by a bushing and sleeve combination. The bushing is sized to slip over the tube while the sleeve is wedged between the tube and bushing so as to secure the bushing in place. The bushing prevents erosions and rupture of the tube occuring by vibration of the tube within the tube plate and is made of a material to prevent welding to the tube plate at high temperature.

PATENTED MAR 30 1971  3,572,770
SHEET 1 OF 2
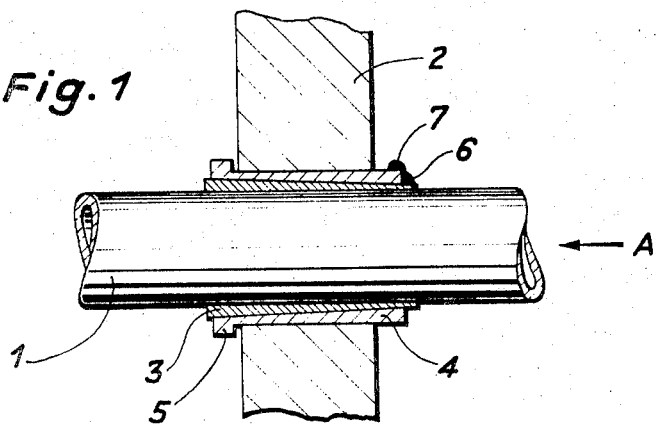
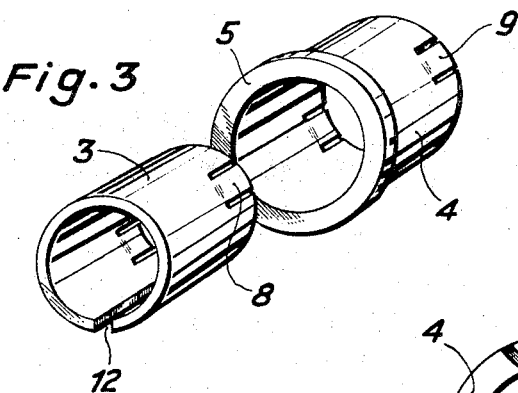
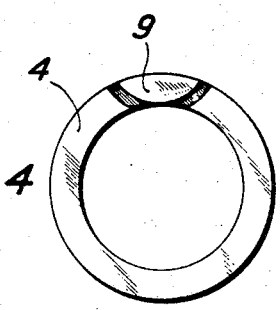
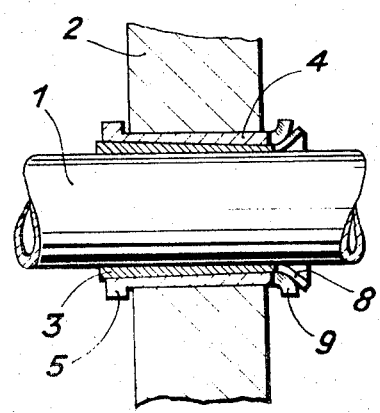
Inventor:
JAKOB KAGI
BY
Kenyon & Kenyon
ATTORNEYS

MOUNTING FOR A HEAT TRANSMITTER

This invention relates to a mounting for a heat transmitter tube. More particularly, this invention relates to a mounting for a bundle of tubes within a tube plate.

Heat transmitters are known wherein a plurality of tubes for conveying a medium to be heated are mounted in spaced relation within at least one tube plate. In such heat transmitters when a heat carrier medium flows substantially transversely of the lengthwise direction of the tubes, the flow causes the tubes to vibrate upon contact therewith. Heretofore, in order to damp out the vibrations, the tubes have been mounted within the tube plates with a clearance so that the tube plates act as damping elements. In these cases, a portion of the vibration energy becomes nullified by the friction resulting from the relative movement between the tubes and the plates.

However, if the heat carrying medium is at a relatively high temperature and a reducing or inert atmosphere should occur a danger arises in that the tubes may become bonded or welded to the plates during vibration due to the lack of an oxide layer. In such an event, further vibration of the tubes can cause the bonded tubes to be torn loose from the tube plates. In the course of time, this leads to rapid erosions which finally cause the tubes to ruptures.

Accordingly, it is an object of the invention to prevent rapid destruction of the tubes of a heat transmitter.

It is another object of the invention to mount the tubes of a heat transmitter in a safe and secure manner.

It is another object of the invention to mount the tubes of a heat transmitter in a manner to prevent erosion.

It is another object of the invention to mount the tubes of a heat transmitter in a manner to prevent bonding of the tubes to the tube plate.

Briefly, the invention provides a mounting for securing the tubes of a heat transmitter within at least one tube plate in a manner to prevent erosion of the tubes thereat. The mounting is constructed of a bushing and a sleeve which cooperate with each other to support a tube within the tube plate. The bushing is sized to fit over the tube and to be slidably fitted within a bore of the tube plate. The sleeve, on the other hand, is sized to fit within the bushing in a wedgelike manner so as to secure the bushing to the tube. The bushing is made of a wall thickness which is thicker than that of the sleeve so that in the event that erosion phenomena occurs, in spite of a favorable selection of bushing material, such can be tolerated for a greater length of time. In addition, the bushing is made of a material or is surface treated so as to avoid being welded to the plate at high temperatures. For example, the bushing can be made of materials such as high alloy, difficult-to-weld steel, chromium-nickel alloy having a low iron content or not iron content, or a relatively ductile ceramic material. Alternatively, the bushing's outer surface can be surface treated, for example, by alitizing (i.e., alloying iron with aluminum at the surface). Further, in order to avoid loosening of the bushing on the tube during an under-heat expansion, the bushing can be made of materials having a coefficient of heat expansion which is smaller than that of the tube material.

In order to simplify the mounting of the bushing on the tube, the adjacent surfaces of the sleeve and bushing can be tapered while the sleeve is slit at least partially in its lengthwise direction. Furthermore, the insertion of the sleeve into the bushing can be facilitated by dividing the sleeve into two or more parts by cutting the sleeve lengthwise.

In order to facilitate the insertion of the tubes into the tube plate, the tube plate can be provided with holes of larger size than otherwise without resulting in a looser holding of the tubes. In addition, the bushing can be inserted into the tube plate so as to move relative to the tube plate in an axial direction. To this end, the bushing can be provided with a flange having a clearance from the tube plate which permits relative movement with respect to the tube plate to a limited amount. In this embodiment, should the individual lengths of tubes become heated unequally and thereby undergo different heat expansions, the tubes will be able to shift relative to one another.

In order to secure the bushing and sleeve together as a unit after mounting on the tubes, the bushing and sleeve can be welded together. Also, the bushing can be formed at the end opposite the flange in a manner so as to prevent being pushed out of the tube plate.

Alternatively, should the bushing and/or sleeve consist of a material which is difficult to weld, each can be provided at one end with tabs, for example, of tonguelike form, so that the fastening of the sleeve and bushing together can be done simply by bending up of the tabs. The tonguelike form of tabs have a manufacturing advantage in that such tabs can be made in a simple manner on a boring machine through milling by means of a hollow borer. Furthermore, such tabs can be bent in a relatively easy manner.

These and other objects and advantages of the invention will become more apparent from the following detailed description and appended claims taken in conjunction with the accompanying drawings in which:

FIG. 1 illustrates a view taken on line I–I of FIG. 5;

FIG. 2 illustrates other modification of the mounting according to the invention;

FIG. 3 illustrates a perspective view of a bushing and sleeve according to the invention;

FIG. 4 illustrates a bushing having a tonguelike tab according to the invention.

Figure 5:
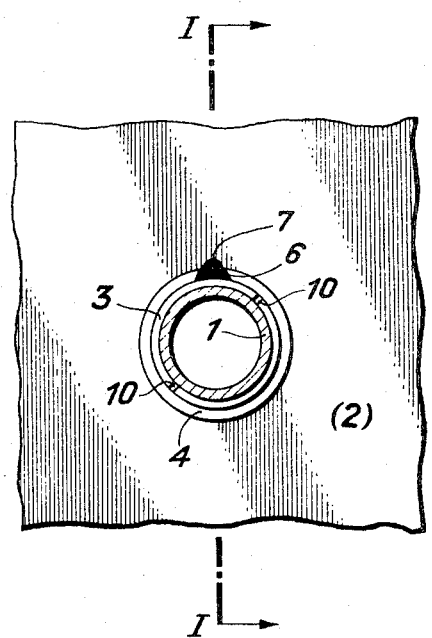
FIG. 5 illustrates an end view taken in the direction of the arrow in FIG. 1.

Referring to FIG. 1, the heat transmitter is constructed with at least one tube 1 which is mounted and held within at least one tube plate 2. In order to mount the tube within an opening with the tube plate 2, a bushing 4 which is sized to fit within the opening of the tube plate 2 is disposed concentrically of the tube 1. In addition, a sleeve 3 is wedged tightly between the bushing 4 and the tube 1 to secure the bushing 4 to the tube 1. The sleeve is formed with an inner cylindrical surface which approximates the outer diameter of the tube 1 as well as with an outside cylindrical surface which is slightly tapered. The bushing 4, on the other hand, has an inner surface which is slightly tapered and an outer cylindrical surface. In addition, one end of the bushing 4 is provided with a radially outwardly directed flange 5 to prevent movement of the mounting out of the plate at that end.

In order to mount the tube 1 within the tube plate 2, the bushing 4 is first pushed onto the tube 1 before insertion of the tube into the tube plate 1. Next, the tube 1 is brought into position within the opening in the tube plate 1 and the bushing 4 is pushed into the hole within the tube plate 2. Thereafter, the sleeve 3 is driven into or pressed into the inside of the bushing 4. This causes a wedging action to take place between the bushing and the sleeve so as to lock the bushing to the tube 1. The sleeve is sized to extend through the extent of the bushing so that the respective ends of the sleeve and bushing can be secured together, for example, by a weld 6. In addition, a weld 7 is formed on the same end of the bushing 4 so as to form a projection which prevents the bushing and sleeve from being pushed out of the perforated plate 2 as a unit from that end.

In order to permit a relative movement between the tube 1 and tube plate 2, for example, to compensate for a differential heat expansion of individual tubes, the bushing 4 is slid into the tube plate 2 so as to have a slight axial play. This play is obtained in either direction, for example, by inserting a shim (not shown) between the flange 5 and the perforated plate 2 during mounting of the tube 1 within the tube plate 2. Once the tube 1 has been properly positioned with the bushing 4 and sleeve secured thereto, the shim can be removed. The bushing 4 and sleeve 3 are thus fixed with respect to the tube plate 2 so as to move relatively thereto in an axial direction.

Referring to FIG. 3, in order to make the mounting resilient in a radial direction, the sleeve 3 is provided with a plurality of slits 12 which run axially thereof. Furthermore, in the event that the sleeve 3 and bushing 4 are made of a material which cannot be easily welded, the sleeve 3 and bushing 4 are each provided with a pair of integral tabs 8, 9, respectively, which are formed by a pair of parallel cuts. The tabs 8, 9 are also bent out of the plane of the sleeve and bushing to present an interlocking fit with each other. To this end, the tabs 8, 9 are aligned over each other so that upon bending outwardly of the tube 1, at least the outer tabs 9 project into the plane of the tube plate.

Referring to FIG. 2, after the sleeve 3 and bushing 4 have been inserted within the opening of the tube plate 2, the tabs 8, 9 are bent out radially so as to fasten the sleeve 3 to the bushing 4 and to secure the resulting unit against being pushed out of the tube plate 2.

Referring to FIG. 4, the tabs 8, 9 of the sleeve and bushing can alternatively be made in cheaper manner with the aid of a boring machine. For example, the tab 9 of the bushing 4 can be made by means of a hollow borer of a milling machine in a tongue-shaped form which is easily bent radially outwardly.

Referring to FIG. 5, in order to facilitate mounting of the sleeve 3 within the bushing 4, the sleeve 3 is made of a plurality of parts. For example, in order to avoid slipping the sleeve over the tube 1, the sleeve is made of two semicircular parts which can be set onto the tube 1 after the tube 1 has been disposed within the plate 2. To this end, the sleeve 3 is severed along two planes 10 to form the two pieces. Subsequently, the two parts are set onto the tube and driven or pressed into the bushing 4 to secure the bushing 4 to the tube 1.

It is noted that instead of using a tapered surface between the bushing and sleeve to insure securement to each other, the respective surfaces of the bushing and sleeve can be provided with cooperating screw threads while only one of the surfaces need be tapered in order to obtain the wedging action needed.

It is further noted that the material of the bushing can be such as to prevent welding of the bushing to the tube plate. For example, the bushing can be made of a high alloy, hard-to-weld steel, an iron-free or low-iron alloy, or a relatively ductile ceramic material. Furthermore, the welding of the bushing to the perforated plate can be inhibited by a surface treatment. For example, the bushing can be alitized on the outer surface so as to increase the protection against erosion.

The invention thus provides a mounting for the tubes of a heat transmitter which is relatively simple to construct and is made of a minimal amount of pieces.

The invention further provides a mounting wherein the components of the mounting substantially reduce the possibility of erosion of the tubes of the heat transmitter. Furthermore, since the mounting, by virtue of the longitudinal slits within the sleeve, supports the tubes in a manner which permits flexing of the tubes with respect to the tube plate, the tubes are able to withstand the vibrational forces imposed upon them by the heat carrying means. The tube plates therefore can act as a damping element for the vibrational forces.

As the material of the mounting components can be made of any suitable material which will prevent welding of the components or the tubes to the tube plate, the danger of rupturing of the tubes is substantially eliminated. Further, in these cases where the material is of a hard-to-weld material, the sleeve and bushing can be locked with respect to each other and with respect to the tube plate in a relatively simple manner.

I claim:

1. In combination with a tube and a perforated tube plate of a heat transmitter, a mounting comprising a metal bushing positioned on said tube within said tube plate and a metal sleeve wedged between said bushing and said tube securing said bushing to said tube, said bushing having a flange at one end thereof spaced from said plate to permit play between said bushing and plate, said bushing and sleeve each including means at the ends thereof for preventing withdrawal from said plate.

2. The combination as set forth in claim 1 wherein said bushing and said sleeve have opposed tapered surfaces.

3. The combination as set forth in claim 1 wherein said sleeve has at least one slot disposed longitudinally thereof.

4. The combination as set forth in claim 1 wherein said sleeve is formed of a plurality of elongated parallel parts for radial mounting on said tube.

5. The combination as set forth in claim 1 wherein said bushing is of a metal material for inhibiting welding to said plate at high temperatures.

6. The combination as set forth in claim 1 wherein said bushing has an alitized outer surface.

7. The combination as set forth in claim 1 wherein said bushing and said sleeve are welded together.

8. The combination as set forth in claim 1 wherein said flange on said bushing projects into the plane of said plate.

9. The combination as set forth in claim 8 wherein said means includes at least one tab on said bushing bent outwardly of said bushing into the projected plane of said plate.

10. The combination as set forth in claim 9 wherein said tab is tongue-shaped.

11. The combination as set forth in claim 8 wherein said means includes at least one tab on each of said bushing and said sleeve disposed in alignment with each other and bent outwardly of said tube.